US006146149A

United States Patent [19]

Daoud

[11] Patent Number: 6,146,149

[45] Date of Patent: *Nov. 14, 2000

[54] BUILDING ENTRANCE PROTECTOR WITH REPLACEABLE FUSIBLE LINK ASSEMBLY

[75] Inventor: Bassel Hage Daoud, Parsippany, N.J.

[73] Assignee: Lucent Technologies Inc, Murray Hill, N.J.

[ * ] Notice: This patent is subject to a terminal disclaimer.

[21] Appl. No.: 09/050,525

[22] Filed: Mar. 30, 1998

[51] Int. Cl.[7] .............................. H02B 1/056; H01R 9/22

[52] U.S. Cl. .............................................. 439/49; 439/709

[58] Field of Search ............................... 439/49, 54, 709, 439/922; 361/800

[56] References Cited

U.S. PATENT DOCUMENTS

| | | | |
|---|---|---|---|
| 4,213,013 | 7/1980 | Perna et al. | 179/98 |
| 4,782,427 | 11/1988 | Marks | 361/426 |
| 5,457,593 | 10/1995 | Glaser | 361/119 |
| 5,706,160 | 1/1998 | Latuszkin et al. | 361/119 |

*Primary Examiner*—Brian Sircus
*Assistant Examiner*—Chandrika Prasad
*Attorney, Agent, or Firm*—Gibbons, Del Deo, Dolan, Griffinger & Vecchione

[57] ABSTRACT

A building entrance protector assembly for interconnecting outside plant wiring to consumer premises wiring. The building entrance protector includes an input termination device (28) for receiving wires contained within the outside plant wiring (12). Similarly, the building entrance protector also includes an output termination device (24) for receiving wires contained within the consumer premises wiring. A first connector port (52) is provided that is electrically connected to the output termination device. A grouping of fusible links (58) is also provided wherein the fusible links have a first end and an opposite second end. The first end (16) of the fusible links is electrically coupled to the input termination device. Furthermore, the second end of the fusible links terminates with a connector (60) that selectively engages the first connector port (52), thereby electrically interconnecting the input termination device to the output termination device.

17 Claims, 4 Drawing Sheets

BUILDING ENTRANCE PROTECTOR WITH REPLACEABLE FUSIBLE LINK ASSEMBLY

RELATED APPLICATIONS

This application is related to the following:

U.S. patent application Ser. No. 09/050,329 entitled SURGE PROTECTOR PANEL FOR USE IN A BUILDING ENTRANCE PROTECTOR, (DAOUD-35), filed Mar. 30, 1998, which is herein incorporated into this disclosure by reference.

BACKGROUND OF THE INVENTION

1. Field of the Invention

The present invention relates to building entrance protectors for telecommunication lines. More particularly, the present invention relates to the wiring systems used for positioning fusible links within building entrance protectors.

2. Description of the Prior Art

Building entrance protector (BEP) is the name used in the art of telephone equipment to describe the junction box where telephone lines from outside plant wiring are joined to customer premises equipment. In the most common application, the BEP is the place where the telephone lines from a telephone pole, for example, enter a building and are joined to the telephone system within that building. Within the BEP there is an input wire termination device that receives the telephone lines contained within the outside plant wiring. Also contained within the BEP is an output wire termination device that receives the telephone lines required for the customer premises equipment. Located in between the input wire termination device and the output wire termination device are fusible links. The fusible links are typically 26 gauge copper wire, which is thinner than the gauge of either the outside plant wiring or the customer premises equipment.

The purpose of the fusible links is to prevent power surges from passing through the BEP that can damage equipment located within the building or melt any wire on the customer side of the BEP. Since telephone lines are typically strung on the same poles as power lines, a break in a power line that subsequently contacts a telephone line, can result in a large surge of power passing through the telephone lines into a building. Similarly, lightning strikes can result large surges of power pass in through telephone lines into a building. The purpose of the BEP is to ensure that any such power surge is stopped at the point of the BEP and is prevented from traveling into the building where it can cause damage to equipment and possibly a fire.

Referring to FIG. 1, a typical prior art BEP 10 is shown. From FIG. 1, it can be seen that as the outside plant wiring 12 passes into the BEP 10, the outside plant wiring 12 passes into a sealed, fire-resistant splice chamber 14. Within the splice chamber 14, some of the telephone wires contained within the outside plant wiring 12 are joined to fusible links 16, via an input wire termination device 18. Each set of the fusible links 16 leads to a different surge protector port 20 on a surge protector panel 22. The different surge protector ports 20 are coupled to an output wire termination device 24, wherein the customer premises equipment connects to the output wire termination device 24.

The fusible links 16 can connect to the outside plant wiring in a number of different ways. Individual wires can be separately joined together. However, such interconnections are highly labor and time intensive. The preferred interconnection mechanism is an input wire termination device 18 such as a terminal array connector. In FIG. 1, the shown terminal array connector 28 is exemplary of the model S 66 M connector manufactured by the Siemens Company.

Referring to FIG. 2, it can be seen that the fusible links 16 are connected to the terminal leads 26 on the bottom of the terminal array connector 28 and the outside plant wiring 12 is connected to the terminal leads 30 on the top of the terminal array connector 28. The fusible links 16 extend through a narrow hole 32 in the wall of the splice chamber 14 and connect to terminals 34 on the bottom of the surge protector panel 22. Should any of the fusible links 16 melt, the severed section of the melted fusible link must be repaired. If the fusible link 16 is severed within the splice chamber 14, the terminal array connector 28 is moved to expose the below lying fusible links 16. The defective portion of the fusible link 16 is cut away and replaced with a new spliced segment of fusible link. The terminal array connector 28 is again set into position and the BEP 10 is ready for use.

In many instances, when a fusible link 16 melts, it causes other fusible links within its vicinity to also melt or otherwise become damaged. These secondary melted and/or damaged fusible links must also be repaired. If a fusible link 16 were to melt and sever at a point under the surge protector panel 22, the fusible link 16 can not be readily repaired. It then becomes more cost effective to replace the entire BEP 10 rather than to effect repairs.

A need therefore exists for a BEP where the fusible links are part of a modular wiring system that allow all of the fusible links to be removed and replaced as a unit without replacing or otherwise affecting the remaining components of the BEP.

SUMMARY OF THE INVENTION

The present invention is a building entrance protector assembly for interconnecting outside plant wiring to consumer premises wiring. The building entrance protector includes an input termination device for receiving wires contained within the outside plant wiring. Similarly, the building entrance protector also includes an output termination device for receiving wires contained within the consumer premises wiring. A first pin connector is provided that is electrically connected to the output termination device. A grouping of fusible links is also provided wherein the fusible links have a first end and an opposite second end. The first end of the fusible links is electrically coupled to the input termination device. The second end of the fusible links terminates with a connector that selectively engages the first pin connector, thereby electrically interconnecting the input termination device to the output termination device.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
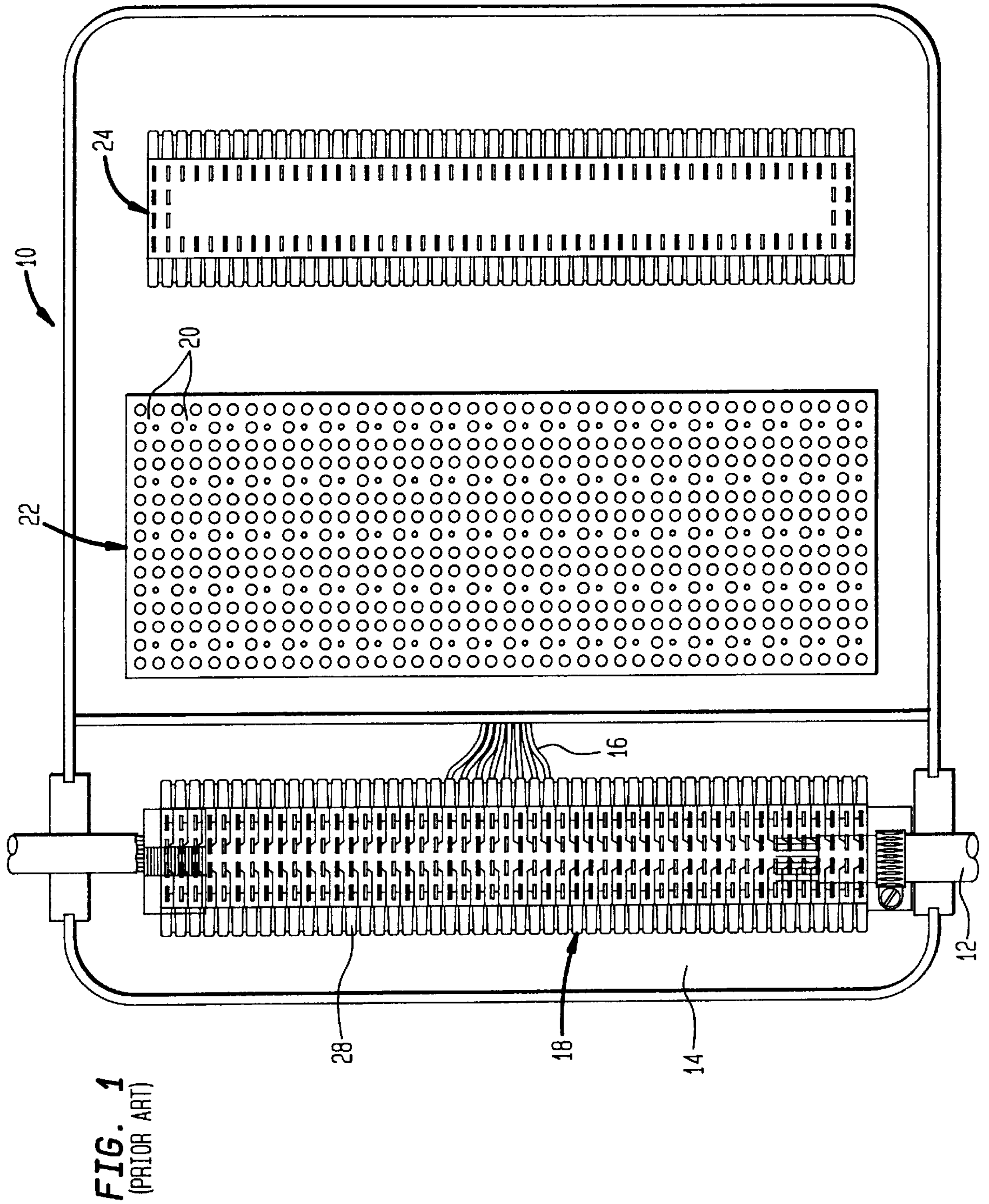
FIG. 1 (PRIOR ART)
FIG. 1 is a front view of a prior art building entrance protector.
Figure 2:
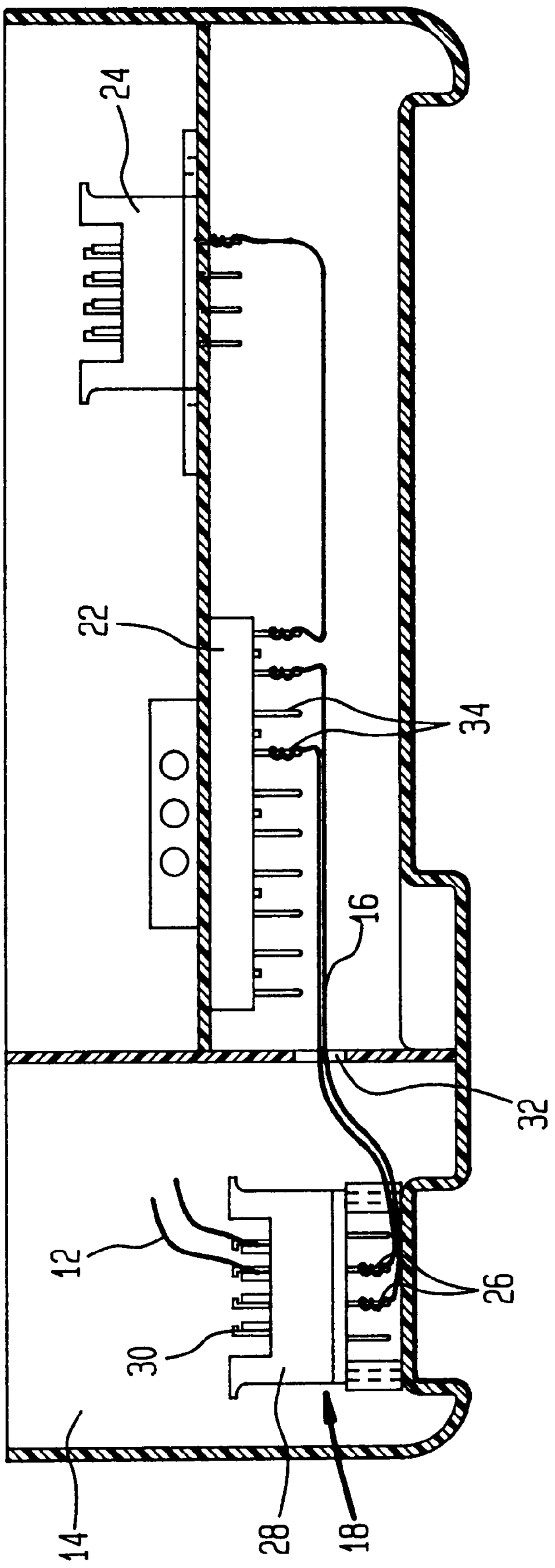
FIG. 2 (PRIOR ART)
FIG. 2 is a cross-sectional view of the prior art building entrance protector shown in FIG. 1.

The present invention improves upon the prior art BEP shown in both FIG. 1 and FIG. 2 and shares many features with that prior art design. For the sake of clarity, elements of the present invention that are the same as the prior art will be referenced using the same reference numerals that were used in describing the prior art.

Figure 3:
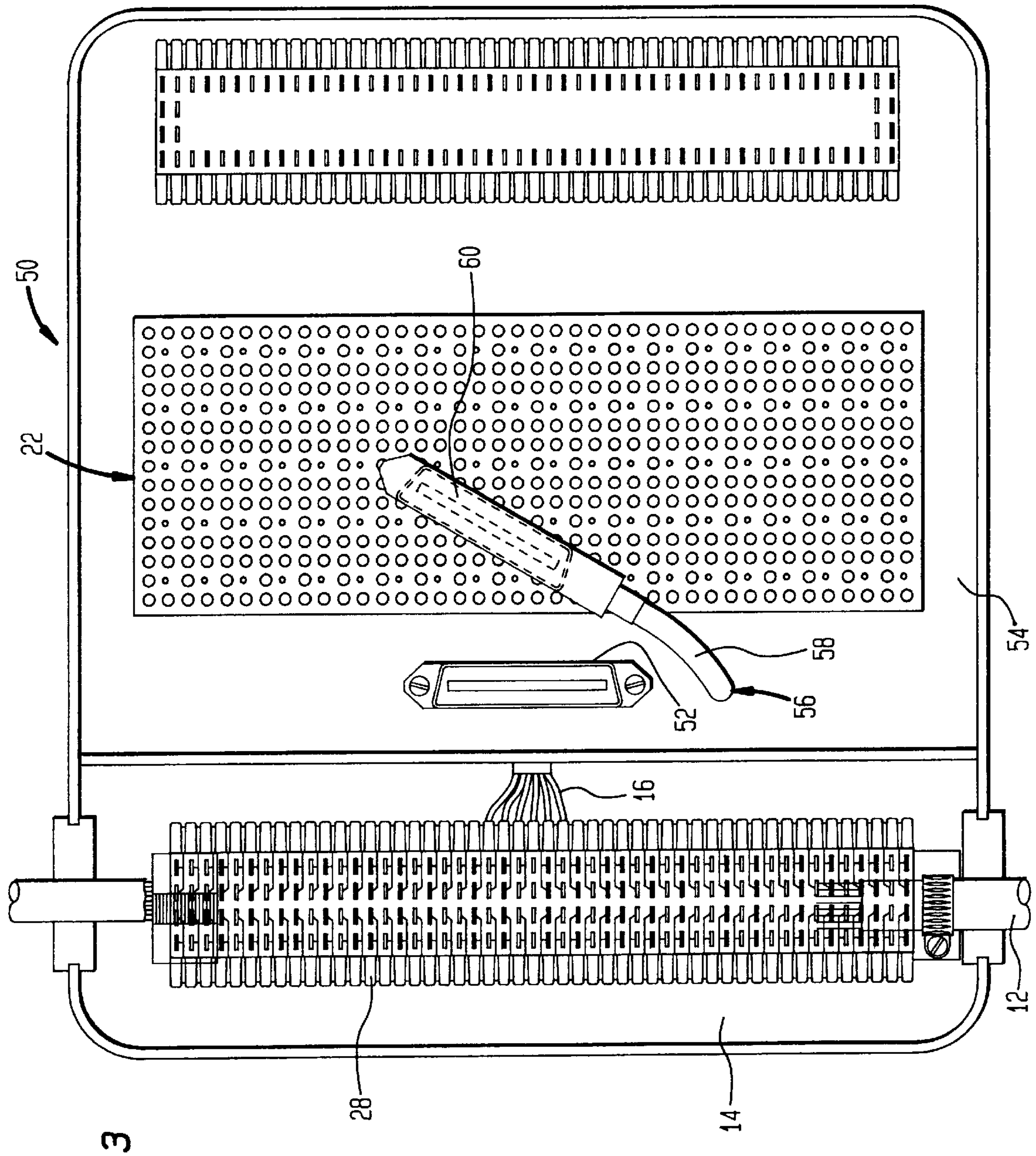
FIG. 3 is front view of an exemplary building entrance protector in accordance with the present invention.

Referring to FIG. 3, a BEP 50 in accordance with the present invention is shown. The BEP 50 contains an input termination device 18 and an output termination device 24, as was previously described in connection with reference to the prior art. In this BEP 50, the surge protector panel 22 is not connected directly to any fusible link. Rather, the surge protector panel 22 is coupled to a pin connector 52. The pin connector 52 is preferably affixed to the same mounting surface 54 as is the surge protector panel 22. Accordingly, the pin connector 52 is positioned so that it is accessible from the same point of access as is the surge protector panel 22.

The pin connector 52 can be any type of either male or female connector. In the shown embodiment, a fifty pin female connector is used by way of example. The pin connector 52 is coupled to the underside of the surge protector panel 22 by either wires or circuit pathways on a printed circuit board. The mounting surface 54 itself can be a printed circuit board. In either case, the current capacity of either the wires used or the circuit pathways used should be greater than that of the fusible links.

The fusible links 16 used in the BEP 50 are contained within a disposable cable assembly 56. The cable assembly 56 contains the same number of fusible links 16 as would a prior art BEP system. However, instead of using individual fusible links, the fusible links 16 are bound in a common cable 58. At one end of the common cable 58, each of the fusible links terminates at a common pin connector 60. The pin connector 60 is sized and shaped to engage the pin connector 52 disposed on the mounting surface 54 next to the surge protector panel 22.

Figure 4:
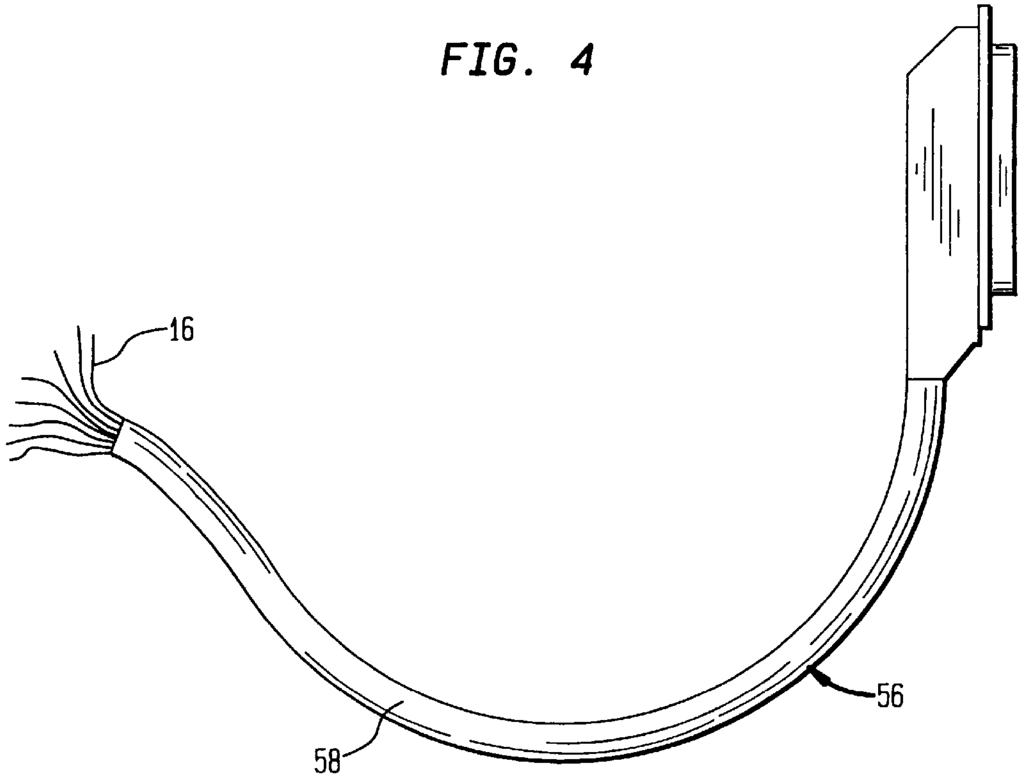
FIG. 4 is a side view of the cable assembly used in the embodiment of FIG. 3.

Referring to FIG. 4, it can be seen that in the embodiment of the cable assembly 56 shown in FIG. 3, one end of the cable 58 is left unterminated. As a result, the fusible links 16 contained within that cable assembly are free to engage the terminal array connector 28 (FIG. 3) in the same manner as prior art fusible links. Alternatively, the free ends of the fusible links can be connected to any wire termination device designed to receive individual wires.

Figure 5:
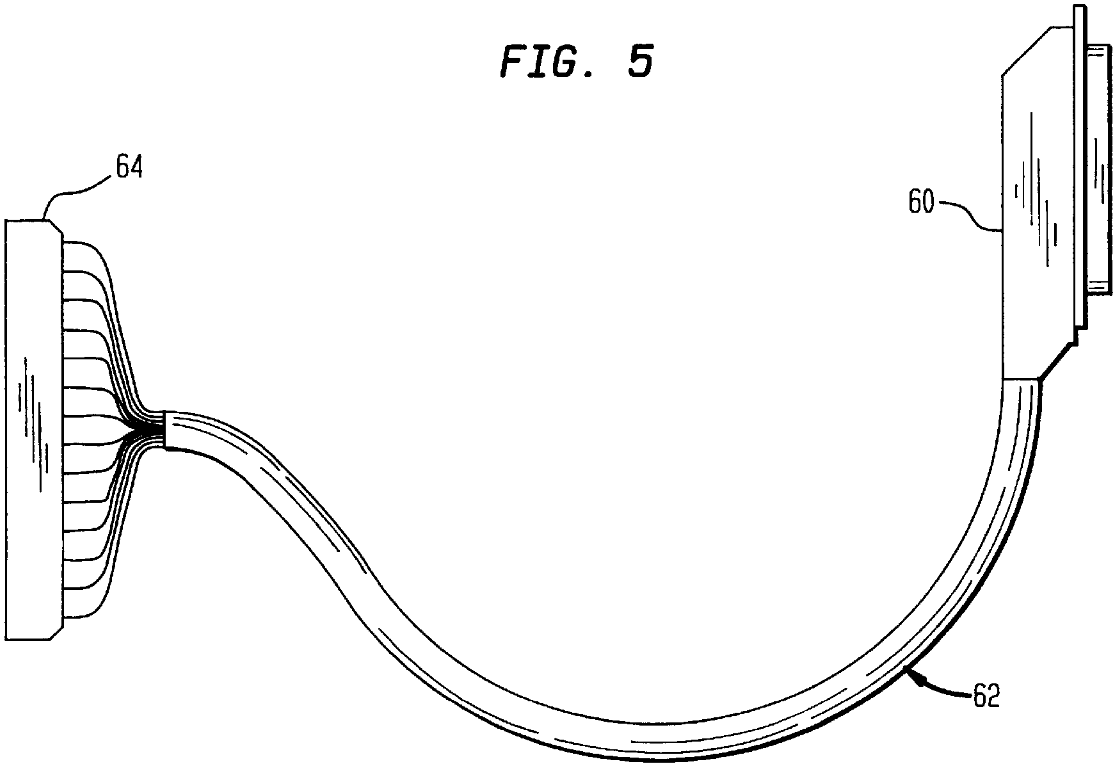
FIG. 5 is a side view of an alternate embodiment of a cable assembly in accordance with the present invention.

Referring to FIG. 5 an alternate embodiment of a cable assembly 62 is shown. In this embodiment, both ends of the cable assembly 62 are terminated. The first end of the cable assembly 62 is terminated with a connector 60 in the manner previously described. However, the opposite end of the cable assembly 62 also terminates with a connector 64. The connector 64 at the opposite end of the cable assembly 62 can be any connector commonly used in the splice chamber of a BEP.

Returning to FIG. 3, it will be understood that if any of the fusible links 16 were to melt, the pin connector 60 at the end of the cable assembly 56 can be disconnected from the pin connector 52 on the mounting plate 54. Similarly, the opposite ends of the fusible links can be disconnected from terminal array connector 28 or any other connector used within the splice chamber 14 of the BEP. The damaged cable assembly can then be replaced as a unit. Labor is no longer wasted in repairing individual fusible links. Furthermore, regardless of where the fusible links melt or how many fusible links are damaged, the fusible links can be quickly replaced without affecting the other components in the BEP 50.

It will be understood that the embodiments of the present invention specifically shown and described are merely exemplary and that a person skilled in the art can make alternate embodiments using different configurations and functionally equivalent components. For example, the types of connectors used at the ends of the fusible link cable assembly can be altered as desired. Furthermore, the number of fusible links on the cable can be varied. All such alternate embodiments are intended to be included in the scope of this invention as set forth in the following claims.

What is claimed is:

1. A building entrance protector assembly for interconnecting outside plant wiring to consumer premises wiring, said building entrance protector comprising:

an input termination device for receiving wires contained within the outside plant wiring;

an output termination device for receiving wires contained within the consumer premises wiring;

a pin connector electrically coupled to said output termination device; and a grouping of fusible links having a first end and a second end, wherein said first end of said fusible links is electrically coupled to said input termination device and said second end of said fusible links terminates with a connector for selectively engaging said pin connector, thereby electrically interconnecting said input termination device with said output termination device such that current flowing between said input wire termination device and said output wire termination device flows through said fusible links, said connector terminating said second end of said fusible links and said pin connector.

2. The assembly according to claim 1, wherein said first end of said fusible links terminates with a second connector for selectively engaging said input termination device.

3. The assembly according to claim 1, wherein said input termination device is a terminal array connector and said first end of said fusible links are terminated on said terminal array connector.

4. The assembly according to claim 1, further including a surge protector panel, wherein said surge protector panel is disposed between said pin connector and said output termination device.

5. The assembly according to claim 1, wherein said fusible links are bound in a common sheath, thereby forming a common cable.

6. The assembly according to claim 1 wherein said fusible links are copper wires having a lower current capacity than said outside plant wiring and said consumer premises wiring.

7. The assembly according to claim 4, wherein said pin connector and said surge protector panel are coupled to a common circuit board.

8. A method of connecting an input wire termination device to an output wire termination device in a building entrance protector assembly, said method comprising the steps of:

providing a grouping of fusible links having a first end and a second end;

terminating said second end of said fusible links with a first connector;

coupling a pin connector to said output wire termination device;

interconnecting said first end of said fusible links to said input wire termination device; and selectively connecting said first connector to said pin connector, wherein current flowing between said input wire termination device and said output wire termination device flows through said fusible links, said first connector and said pin connector.

9. The method according to claim 8, wherein said first end of said fusible links terminates with a second connector.

10. The method according to claim 9, wherein said step of interconnecting said first end of said fusible links to said input wire termination device includes connecting said second connector to said input wire termination device.

11. The method according to claim 8, wherein said fusible links are bound in a common sheath, thereby forming a common cable.

12. The method according to claim 8 wherein said fusible links are copper wires having a lower current capacity than said input wire termination device and said output wire termination device.

13. The method according to claim 8, wherein said input wire termination device is a terminal array connector.

14. In a building entrance protector having an input wire termination device and a pin connector that leads to an output wire termination device, a fusible link assembly, comprising:

a plurality of fusible links, each having a first and second end; and a first connector adapted to be selectively received with said pin connector, wherein the second end of each said fusible link terminates with said first connector.

15. The assembly according to claim 14, further including a second connector adapted to engage said input wire termination device, wherein said first end of said fusible links terminates at said second connector.

16. The assembly according to claim 14, wherein said fusible links are 26 gauge copper wires.

17. The assembly according to claim 14, wherein said fusible links are bound in a common sheath, thereby forming a common cable.

* * * * *